United States Patent
Crow et al.

(10) Patent No.: US 6,871,345 B1
(45) Date of Patent: Mar. 22, 2005

(54) SELF MANAGING SOFTWARE AGENTS WITH INTROSPECTION

(75) Inventors: James J. Crow, Austin, TX (US); Dennis L. Parker, Leander, TX (US)

(73) Assignee: Motive, Inc., Austin, TX (US)

( * ) Notice: Subject to any disclaimer, the term of this patent is extended or adjusted under 35 U.S.C. 154(b) by 0 days.

(21) Appl. No.: 09/542,274

(22) Filed: Apr. 4, 2000

(51) Int. Cl.[7] .............................................. G06F 9/445
(52) U.S. Cl. ...................... 717/175; 717/169; 717/170; 717/120; 717/115; 709/203
(58) Field of Search ................... 717/116, 115, 717/114, 168, 174, 170, 171, 172–178, 106–108, 120–122, 162–167, 100, 137, 125, 124, 107; 709/200, 263, 231, 310, 313, 317, 315–316, 330–332; 715/500, 511; 707/103 R, 203, 200, 1, 3; 700/90; 345/762

(56) References Cited

U.S. PATENT DOCUMENTS

| | | | | |
|---|---|---|---|---|
| 5,933,646 A | * | 8/1999 | Hendrickson et al. ....... | 717/169 |
| 5,951,694 A | | 9/1999 | Choquier et al. .............. | 714/15 |
| 6,085,120 A | * | 7/2000 | Schwerdtfeger et al. ...... | 700/90 |
| 6,128,293 A | | 10/2000 | Pfeffer ......................... | 370/359 |
| 6,188,888 B1 | | 2/2001 | Bartle et al. ................. | 455/417 |
| 6,199,104 B1 | | 3/2001 | Delph .......................... | 709/208 |
| 6,209,125 B1 | * | 3/2001 | Hamilton et al. ............ | 717/125 |
| 6,237,135 B1 | * | 5/2001 | Timbol ........................ | 717/107 |
| 6,256,772 B1 | * | 7/2001 | Apte et al. ................... | 717/100 |
| 6,298,353 B1 | * | 10/2001 | Apte ........................ | 707/103 R |
| 6,324,619 B1 | * | 11/2001 | Raverdy et al. ............. | 717/120 |
| 6,330,006 B1 | * | 12/2001 | Goodisman ................. | 345/762 |
| 6,381,742 B2 | * | 4/2002 | Forbes et al. ................ | 717/176 |
| 6,438,744 B2 | * | 8/2002 | Toutonghi et al. ........... | 717/137 |
| 6,463,078 B1 | | 10/2002 | Engstrom et al. ............ | 370/466 |
| 6,463,578 B1 | * | 10/2002 | Johnson ...................... | 717/124 |
| 6,473,791 B1 | | 10/2002 | Al-Ghosein et al. ........ | 709/217 |
| 6,477,580 B1 | | 11/2002 | Bowman-Amuah ......... | 709/231 |
| 6,490,722 B1 | * | 12/2002 | Barton et al. ................ | 717/174 |
| 6,564,377 B1 | * | 5/2003 | Jayasimha et al. .......... | 717/174 |
| 6,704,927 B1 | * | 3/2004 | Bak et al. .................... | 717/151 |
| 2001/0020249 A1 | | 9/2001 | Shim .......................... | 709/220 |
| 2002/0095400 A1 | | 7/2002 | Johnson et al. ................ | 707/1 |

FOREIGN PATENT DOCUMENTS

| JP | 02001117932 A | 4/2001 | ........... G06F/17/30 |
|---|---|---|---|

* cited by examiner

*Primary Examiner*—Antony Nguyen-Ba
(74) *Attorney, Agent, or Firm*—Campbell Stephenson Ascolese LLP; D'Ann Naylor Rifai (57) ABSTRACT

A system and method is described for managing plugin program components through encapsulation in a self managing agent that supports introspection for installation. An agent evaluator engine at the host machine interrogates the introspective interface for the agent to determine what resources are required by the plugin. In addition, the engine determines what effect the plugin will have on the host system, and invokes the installation logic which may be contained in the agent. Using the introspective mechanism and installation logic, any changes in the plugin (such as revisions) and the associated dependency changes can be readily accommodated since only a single base of information and installation logic, that which is contained within the enclosing agent, requires modification.

32 Claims, 5 Drawing Sheets

SELF MANAGING SOFTWARE AGENTS WITH INTROSPECTION

INCORPORATION BY REFERENCE

The following applications are hereby incorporated herein by reference in their entirety and made part of the present application:

(1) U.S. patent application Ser. No. 09/542,602, filed concurrently herewith; and (2) U.S. patent application Ser. No. 09/542,273, filed concurrently herewith.

BACKGROUND

1. Technical Field

The present invention relates to the field of computer systems. In one aspect, the present invention relates to computer software agents with introspection that manage computer software plugins, and that can be used in connection with other computer programs.

2. Description of Related Art

In computer network applications, particularly telecommunication networks (e.g., the Internet), it is common for an application running at a particular computer to interact with or use another application that may be located at the same computer or at a different computer connected to the network. In addition, technology in the computer area is subject to rapid change, both in the hardware and software technologies that are continually introduced. As a consequence, computer applications in a network environment are often faced with changes in the network environment, whether they be changes in software applications used by a program or changes in hardware (including changing the machines or connections used to run services in the network environment). The challenge of adapting to new technologies resides not only with the end user or client side, but also with the network service provider. For example, an Internet Service Provider ("ISP") experiences changes in the hardware and software technologies that must be supported, in the expectations of the subscribers, and in the need for service enhancements to respond to competitive pressures.

Generally speaking, computer software products that require modification or extension after the software products are up and running on a client system (for example, within a client/server environment) are typically extended using a plugin module that interfaces the client system wherein the software product is resident. The client system must recognize and install the appropriate plugin to complete a software extension and must interface both the plugin module and the software product. The responsibility for all knowledge of how to verify the appropriateness of the use of a specific plugin module (due to version changes, procedural interface changes, functional changes, etc.) resides both in the host computer system as well as all related modules that expect to use the plugin module.

This base of information grows exponentially as plugin modules are added and evolve over the life cycle of the software product. Indeed, sweeping upgrades to existing modules may be required each time a new individual plugin is defined. For example, in conventional client/server based systems, the management of distributed state information for the system requires storage of per-client state information at the service end so that services can rely on certain facts about the client state. Such a server would need to store overhead information about the particular programs and versions available at a client to permit proper interaction between the server and client. Hence, the conventional system for implementing extension creates the significant problem of an ever-growing base of information that is required to maintain compatibility. In conventional systems, each new software extension, or "plugin" module, creates a new set of module interdependencies that must be maintained in all modules that expect to use the newly created plugin. Furthermore, the controlling system must contain all information about the management of the plugin prior to actually loading it and providing its services to the software system. In addition, with conventional plugin modules, user intervention is typically required to effectuate software extension.

Further limitations and disadvantages of conventional systems will become apparent to one of skill in the art after reviewing the remainder of the present application with reference to the drawings and detailed description which follow.

SUMMARY OF INVENTION

In accordance with the invention, an apparatus for storing a computer-readable module for use in a host computer is provided where the module comprises a functional component for providing a predetermined programming functionality, and a preprocessing interface component for providing introspective information about any requirements of the functional component in response to a request from the host computer. In addition, an installation program component may be provided as part of the module or as part of the host computer that manages the installation of the functional components. The preprocessing interface may be implemented in a variety of ways, including implementation as command sequences that encapsulate or identify the functional component, or as executable object code that encapsulates or identifies the functional component. In selected embodiments, the host computer may request introspective information as part of an installation of the module in the host computer, or when the module is required by a second module stored at the host computer. The introspective information provided by the preprocessing interface may be version information for the module, identification of an external module required by the functional component, identification of the type of functional component, identification of at least a first resource at the host computer that will be modified by the functional component, or any of a variety of other identification data specifying the behavioral or functional requirements of the module.

In accordance with an alternate embodiment of the present invention, a computer system is provided including a first computer having at least a first plugin module and a harness. Such a computer system may be a client/server system where the first plugin module is a client plugin module or a server plugin module, may be network computers (sometimes described as "thin client" systems) or dumb terminals, or may be any other arrangement of computer machines in connection with which modules are used, whether locally or remotely.

The first plugin module includes an introspection interface portion and a program behavior portion, and may also include an installation program component. The harness evaluates the introspection interface portion of the first plugin module to determine if any resources are required for use of the program behavior portion of the first plugin module. In addition, the computer system may also include a second computer connected to the first computer, where the second computer includes a first resource required by the first plugin module that is transferred to the first computer upon request by the plugin installation program component, or upon request by the harness. In a selected embodiment, the first resource is a second plugin module that itself includes an introspection interface portion, an installation manager portion and a program behavior portion. In addition or alternatively, the harness may be configured to evaluate the introspection interface portion of the second plugin module to determine if any resources are required for use of the program behavior portion of the second plugin module. As will be appreciated, either or both of the introspection interface portion and the installation manager portion may be an executable script (e.g., a Tcl script), a command series or an object-code module.

In connection with the present invention, a harness assists with the introspection and/or installation of new modules. In a selected embodiment, the harness includes a loader component for loading a plugin module comprised of an introspection interface portion, an installation manager portion and a program behavior portion; a validator component for interfacing with the introspection interface portion to identify any resources required by the plugin module; and a finder component for surveying the computer system for any resources identified by the validator component.

In accordance with a still further embodiment of the present invention, a method is provided for preprocessing a software module that has an interface portion and a program portion. The method includes receiving a first software module, querying the interface portion of the first software module to identify any resources required by the program portion, and invoking the installation manager portion of the module if all resources required by the program portion are available. For example, the first software module may be received by connecting to a remote computer over a telecommunication network and downloading the first software module from the remote computer. In addition, resources required by the program portion are retrieved that were identified as a result of querying the introspection interface portion prior to invocation of the first software module or as a result of invoking the installation manager portion. In a selected embodiment where the retrieved resource is a second software module comprised of an introspective interface portion, an installation manager portion and a program portion, the interface portion of the second software module is queried to identify any resources required by the program portion of the second software module.

DETAILED DESCRIPTION OF DRAWINGS

Figure 1:
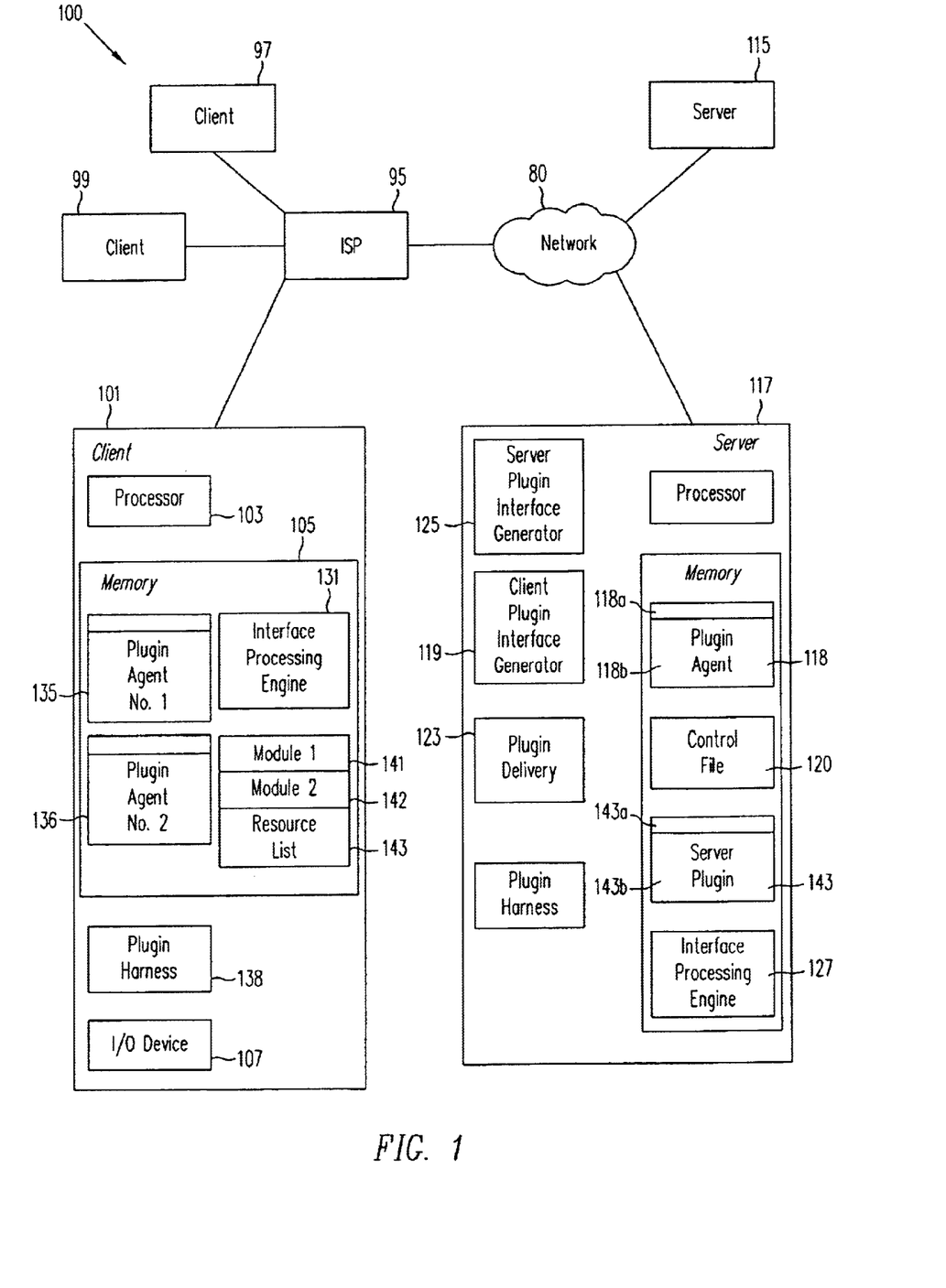
FIG. 1 shows a distributed network environment wherein individual computers use the plugin agents and the plugins they manage to enable dynamic extensibility of computer software according to the present invention.

FIG. 1 shows a distributed network environment 100 in which extensible services are dynamically provided to the subscriber/clients 97, 99, 101. In such a network the process of connecting a client 101 to the services it wants to use must satisfy diverse requirements for performance, flexibility, scalability and manageability. From the perspective of the service provider, the flexibility and scalability requirements must be considered foremost, especially on the server side of operations where the number of client requests per task, and the complexity of the tasks themselves, should be simplified. In such networked computer applications, including client/server arrangements, plugin component technology can be used to respond to these changing requirements in both client 97, 99, 101 and server 115, 117 components. The terms client plugin or plugin functionality refer to a piece of program behavior that can be loaded into a client at runtime. This can include scripts, load-able libraries, executable programs and potentially other items such as configuration and graphics modules. A "plugin" approach of the present invention is especially useful in allowing the latest code to be loaded from a service and run without restarting the application. The plugins 135, 136 that are loaded into the client 101 may represent purely local functionality or the client portion of a distributed service.

In accordance with the present invention, the client/server network 100 shown in FIG. 1 may include one or more client systems 97, 99, 101 and/or one or more server systems 115, 117 in which plugin manager agents of the present invention may be used. Examples of client/server platforms that may be used with the present invention include Digital Open VMS, Digital UNIX, DOS, Java, Macintosh, Linux, Microsoft Windows, Sun Solaris, IBM AIX, etc.

Figure 2:
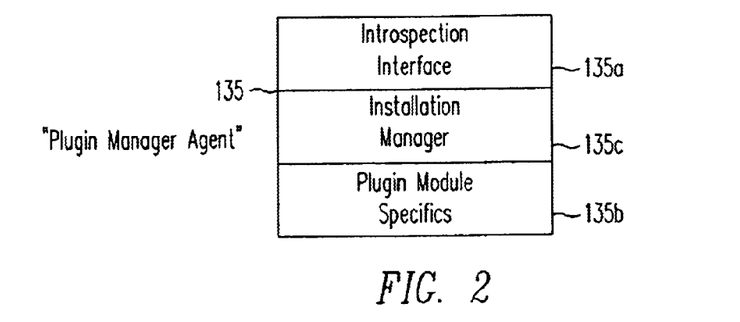
FIG. 2 shows an exemplary plugin manager agent having an introspection interface and an installation manager interface used in the network of FIG. 1.

FIG. 2 shows the plugin manager agent having an introspection interface used in connection with the present invention. As shown in FIG. 2, the plugin manager agent encapsulates the details of the interactions between the plugin and the running program that contains the external controller. The controller can extract any of this information that the controller requires by interrogating the introspection interface 135a of the agent. The controller can use the extracted information in order to determine whether to load the plugin component 135b that is encapsulated within the agent 135. The controller can also use extracted information to perform the functions that are necessary to prepare the controller or its containing program to receive the plugin component. Alternatively or in addition, the controller can invoke the agent's installation manager component 135c to cause the load to take place under the control of logic specific to the requirements of plugin component 135b. As the plugin functionality 135b evolves as described above, only a single base of information, that which is contained within the very module that has changed, requires modification. Using the introspective mechanism 135a and the installation manager component 135c, this change and the associated dependency changes are taken into account upon installation and/or invocation in accordance with the present invention.

This method also provides for the management of a heterogeneous set of plugins within a system. Since the details of the plugin are encapsulated within the module itself, the details are free to change in arbitrary ways in the future with no impact to installed controller systems.

As shown in FIG. 2, the plugin agent module of the present invention consists of the actual plugin component 135*b* (i.e., a plugin to provide a new service, application or other feature) and two components of the agent which enclose and encapsulate the plugin component. The first agent component is an introspective interface 135*a* that allows an interrogation process to discover the characteristics of the enclosed plugin. The second component is an installation manager component 135*c* that manages the process of preparing the target program and system as well as the plugin component itself for the installation process, and actually installing the plugin component 135*b*.

In one embodiment, the plugin component 135*b* is object code, etc., and the installation interface 135*a* and installation manager 135*c* are command scripts that encapsulate the plugin component. These commands provide certain interface features, including an introspection capability that responds to interrogation with the details of the identity and characteristics of the plugin modules. These characteristics specify the types and versions of other modules or programs that are required for the plugin component to function. The introspection capability may identify not only the other modules required to run the plugin component, but may also identify alternative groupings of modules as options for running the plugin component. The introspection interface 135*a* may also provide version information for the plugin to the outside world. The installation manager component 135*c* of the agent contains executable functionality that implements the logic which is required to correctly load the plugin component into the client system.

In accordance with alternate embodiments, the plugin functionality 135*b* is implemented in executable code and the introspective interface 135*a* and installation manager 135*c* are also implemented in executable code so that the entire module 135 can be compiled and run as a unit of code. While the plugin 135 in this embodiment is not in any strict sense of the word "scripted," the introspection functionality 135*b* is still provided, though with a coded interface 135*a* rather than a scripted interface. A plugin in this form continues to provide compatible introspection and installation management functionality.

As yet another alternative embodiment, the plugin functionality 135*b* and the introspection interface 135*a* and installation manager 135*c* are all implemented in command scripts.

As may be appreciated, the plugin functionality of 135*b* may be of arbitrary form where the interface 135*a* defines specific details about its installation and use.

Referring again to FIG. 1, the computer system (e.g., 101) that receives the plugin manager agent 135 includes a mechanism for installing or loading the plugin module. One example of such a mechanism is a plugin harness 138 or plugin engine. This mechanism is used to install, invoke and/or run the plugin module, whether the plugin module be command script, directly executable code or some combination program. The plugin engine may be implemented as a command evaluation engine, directly executable code or some combination of the two depending upon the types of plugin modules that are to be used. Regardless of form, the engine provides installation/invocation processing in connection with a new plugin module through a series of steps which are outlined in FIG. 3.

Figure 3:
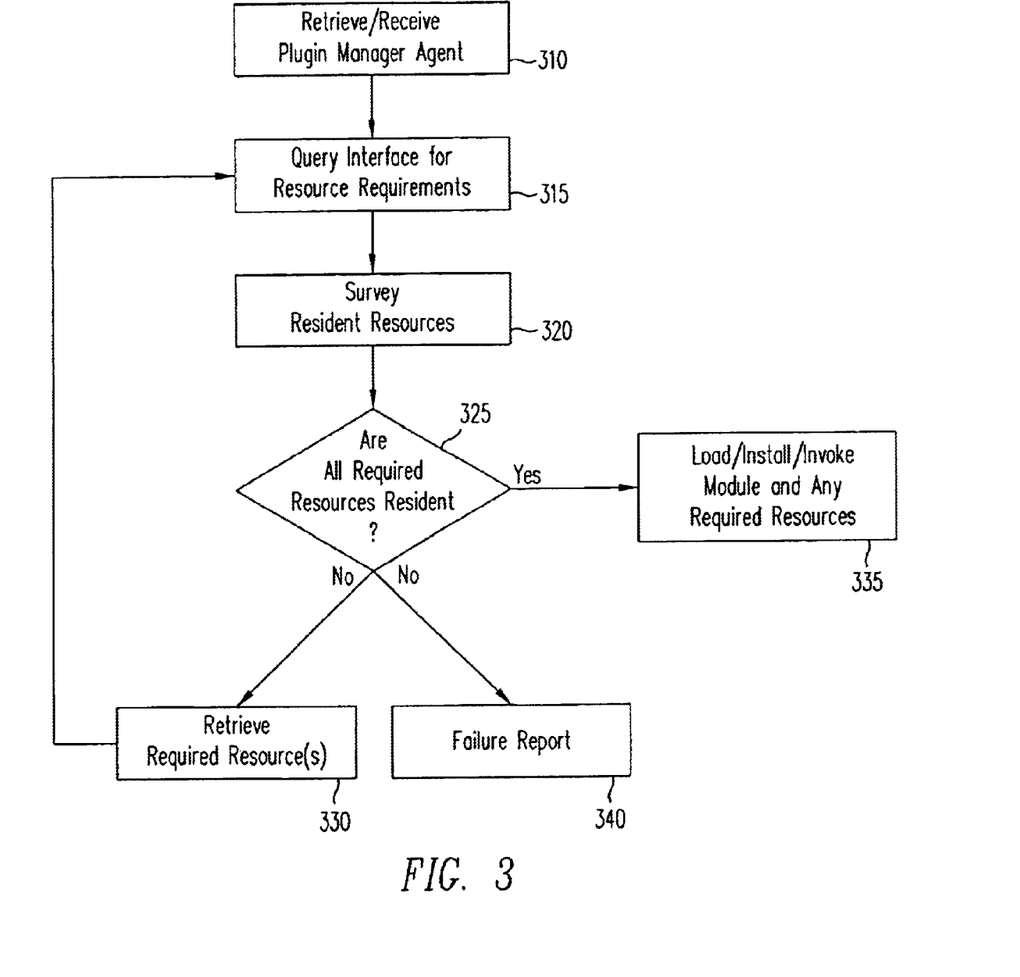
FIG. 3 is a flowchart representation of the operation of the client system in FIG. 1 to illustrate the installation of plugin module in accordance with one embodiment of the present invention.

As shown in FIG. 3, the engine first retrieves or receives a new plugin manager agent (step 310). This can be accomplished in a variety of well-known ways, including retrieving the module from a floppy disk, CD-ROM, remote storage or from another computer system on the Internet. Once retrieved, the plugin manager agent will be used to install the plugin module prior to actual use of the module. In accordance with one embodiment of the present invention, the installation proceeds under the control of the plugin engine which queries the introspection interface portion of the plugin module to determine the extent to which the plugin module can be installed.

In particular, the engine queries the new module to determine from the introspection interface of the module what, if any, other modules are required to run the new module (step 315). As will be appreciated by those skilled in the art, this determination can be accomplished in many ways. In one embodiment, the query step 315 asks the plugin manager agent 135 to identify the plugin module's version information and to also identify any other modules (including version information for the modules) that are required for the plugin module to operate. Additional information can be retrieved from the plugin manager agent 135 through the introspection interface 135*a*, including the application environment in which the plugin should run and the type of plugin identifying whether the plugin defines procedures, creates objects or procedures, creates or updates files or loads various program behaviors such as libraries or executables. Additional retrieved information may include a listing of procedures, files, objects or configuration values that the plugin will define, create, replace or modify. For example, a procedure named "Install_Widget_1.0" uses an "option" parameter to provide the introspection that is used to determine correct way to load the plugin. By evaluating the procedure with a pre-defined value for the option parameter, the client program can learn such details as the form of the plugin (command script, Windows DLL, Solaris ".so" library, etc.), the nature of the resources it requires, the details of the interface it implements, etc.

Through the execution of logic within the introspection interface 135*a*, the plugin engine then determines if the computer system on which the engine resides has the other modules that are required for the plugin module to operate (320). Such a determination can involve searching the memory storage 105 of the computer system 101 to locate the required modules 141, 142, or may also include searching through remote storage locations (i.e., on other computers 115 to which the computer system is connected over a telecommunication network). In addition, the availability of required resources can be determined by searching a list of resources 143 available to the computer system, where the list was previously or periodically generated to expedite the speed of any such survey.

Based on the introspection and survey (steps 315, 320), the engine can then determine whether all of the required resources are available at the computer system (step 325). If all required resources are available, then installation can proceed immediately upon determining that there are not conflicts presented by using the new module (step 335). The plugin may be installed, either by the plugin engine or by the plugin module itself. Once the plugin engine has made the determination to proceed with the installation, it invokes the agent's installation manager code 135*c* to complete the installation. If any required resource is not available, then the engine retrieves the required resource from a resource repository whose location is previously known (step 330). For example, the computer system 101 can contact a designated server 115 or group of servers over a telecommunication network 80 to retrieve the required resource from a library of resources stored at the server 115. Alternatively, local storage 105 could include a pointer or vector for a site where the desired resource is stored. Another option upon determining that the required resources are not available (step 325) would be to issue a failure report to indicate that the plugin module and any required resources cannot be loaded (step 340).

Of course, once a resource is retrieved (step 330), the process may be repeated all over again. For example, if the engine retrieves a required resource (e.g., a graphics extension module) for the new plugin module that is not locally available, the engine invokes the introspection interface (step 315) of the graphics extension module to determine what resources are required by the graphics extension module, and again checks the availability of such resources locally (step 320) before deciding whether to retrieve any missing resources before installation (steps 325, 330), or to instead indicate that the plugin cannot be installed (step 340).

Once the plugin engine has collected the information it needs in order to prepare to load the plugin module 135b, the plugin engine invokes the agent's installation manager 135c to complete the installation. The plugin installation manager 135c is expected to manage the details of loading from this point on, although it may certainly make use of features of the client program. As mentioned above, this can be a multi-step process, whereby a plugin is loaded, decides that it needs to install another plugin in the client program in order to complete its install, and does so using the methods and techniques of the present invention. The installation manager 135c may also locate, transport and store files, program components and other plugins under its own direction and with or without the direct involvement of the plugin engine. This ability is not limited to the actions that are provided by the plugin engine, but may use operating system facilities as well as facilities of other plugin components. The installation manager 135c may also determine and ensure the presence of prerequisite resources through mechanisms that have complete, some or no dependence on the plugin engine. The installation manager 135c is in this respect an independent agent that is loaded and started by the plugin engine.

In accordance with one embodiment of the present invention illustrated in FIG. 2, the details of a plugin code are abstracted through the use of an interfaces 135a and 135c where logic and procedures are resident within the plugin manager agent 135. In this manner, the host system or related module needs only to support the interface language in use to fully interoperate with the newly added plugin manager agent 135. Since the interface logic for 135a and 135c is contained within the plugin manager agent 135, all requirements for specific knowledge about the plugin are localized to the agent 135. This abstraction allows arbitrary plugin architecture and services.

The relationship between the plugin manager agent 135 and the host system (i.e., client 101) allows the client's system controller 103 to install the plugin via an abstracted interface. The system controller invokes the installation manager interface 135c that is contained within the agent 135. As this interface is evaluated or executed, all system dependencies and versioning information are correlated and the agent 135, in effect, manages the installation of the plugin component that it contains. A success/fail signal is returned to the system controller to indicate progress and availability of the plugin for further use.

As for the relationship between the newly installed plugin 135 and another resident plugin 136 or related module in the client 101, as services are required of the new plugin 135, an invocation interface 135a is used to properly identify and validate the requested usage of the plugin 135. As the interface logic is evaluated, information such as version compatibility and/or procedure interfaces is resolved in an active manner with plugin specific behavior possible. As the installation logic 135c is evaluated, interface version and state management requirements are resolved so that the newly installed plugin 135b can interoperate with another resident plugin such as 136 or related module in the client such as 101. After a successful evaluation of the installation interface, the environment for direct "native" use of the plugin component 135b by the related module 136 has been enabled. Ongoing use of the plugin is then accomplished in whatever arbitrary manner that may be required for efficiency or other requirements, as will be appreciated by those skilled in the art.

As described herein, management aspects of plugin modules are accomplished via the introspection interface 135a and installation manager 135c which allows for completely dynamic and extensible behavior. The management interface itself may be extended on a module by module basis allowing for unlimited future functionality while maintaining the history of previous methods. This has the added benefit of eliminating unused or outdated control logic automatically from the controlling system. Without the active agent method, the controlling system is typically extended to contain the specific information of module evolution. This usually results in an ever-increasing code size to maintain historical compatibility. With the active agent method, only the actual required management code is present because it resides directly within the modules that require management. When a module is replaced or becomes outdated and is deleted, its specific management logic and associated code overhead leave the system immediately.

Figure 4:
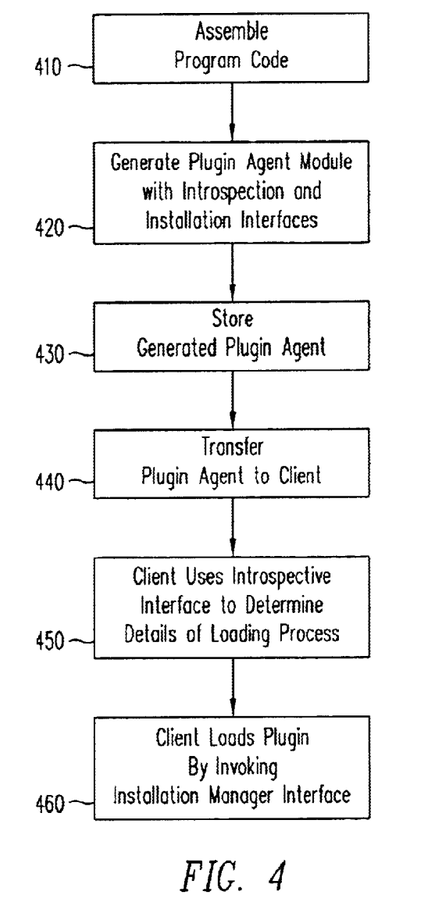
FIG. 4 is a flowchart illustration of how a plugin manager agent is created and loaded according to an exemplary embodiment of the present invention.

FIG. 4 illustrates an exemplary method of creating and loading a plugin in accordance with the embodiments of the present invention shown in FIGS. 1 and 2. First, the relevant pieces of program behavior 135b are assembled at computer 117 (step 410) and submitted to a plugin generator 119, which encapsulates these pieces in a plugin manager agent 135 having an introspection interface 135a and installation interface 135c (step 420). With reference to the interface logic generation (step 420) shown in FIG. 4, the assembled program behavior or code is encapsulated, regardless of the form of the code, be it command script, loadable binary library, executable, etc. In particular, the generator 119 adds program behavior that causes the plugin to support an introspection interface and implement the plugin specific installation process.

Next, the newly created plugin manager agent 135 is placed in storage at a location that can be accessed by the client 101 (step 430), whether at the client computer 101, at a remote computer on the network 115, 117, or both. Next, the client 101 requests or receives a copy of the plugin manager agent from storage (step 440). The client 101 may either have some built in knowledge of the location of the plugin manager agent, or it "discovers" the plugin manager agent via an enumeration application programming interface ("API") that calls the plugin storage site. After the plugin manager agent has been transferred to the client (step 440), the client uses the introspective features of the plugin manager agent's interface 135a to determine the exact details of the loading process (step 450). Finally, the plugin manager agent's installation manager interface is invoked and the plugin component is loaded and is available for use by the client (step 460).

Figure 5:
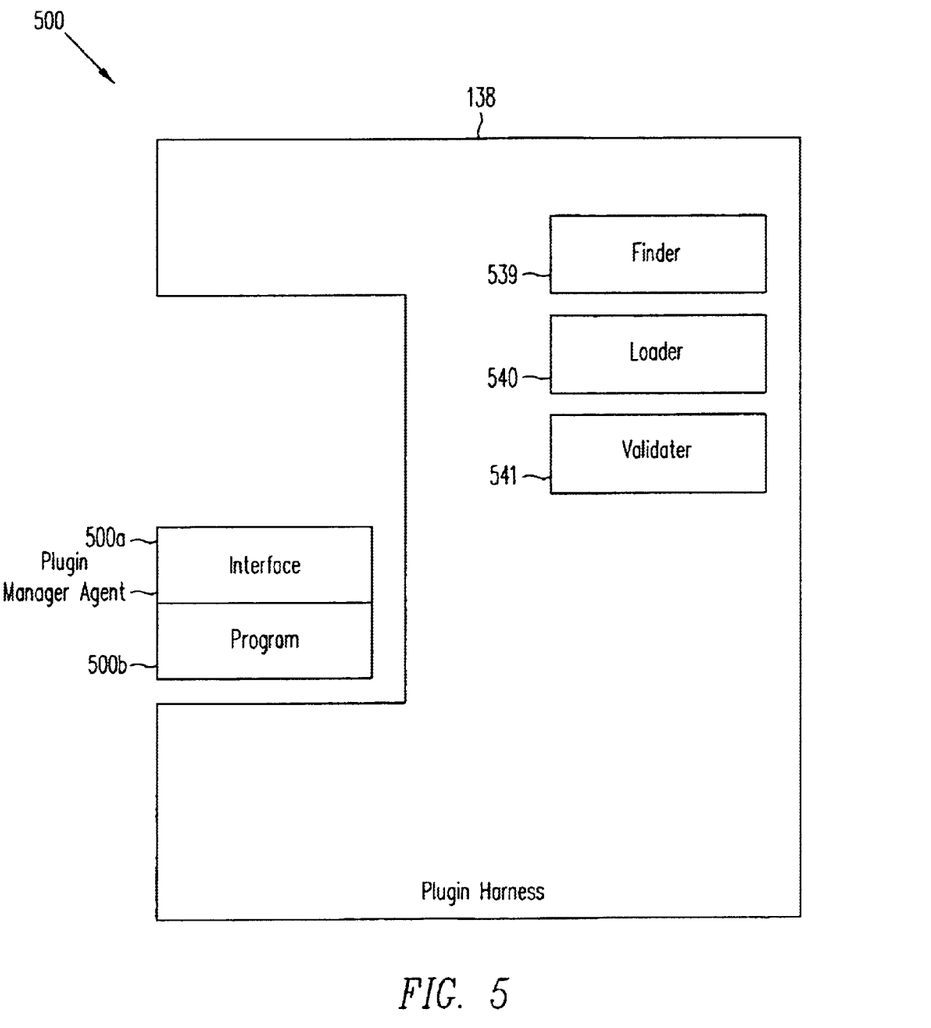
FIG. 5 illustrates the functional components of an exemplary client plugin harness shown in FIG. 1.

As shown in FIG. 1, the client 101 may include a client plugin harness component 138 that encapsulates the task of finding and loading plugins into an API for client programs (steps 440, 450, 460 shown in FIG. 4). FIG. 5 illustrates the components of an exemplary client plugin harness 138. It will be appreciated that the harness functionality is implemented in either hardware or software form, or a combination thereof.

As described in the related applications incorporated by reference herein, a plugin manager agent 500 may be located by name or characteristics in the distributed network 100 using the finder component 539. Once the path to a particular plugin manager agent has been determined by the finder 539, this path is presented to the client plugin harness loader 540 in a "load plugin" request. The client plugin harness then checks the validity of the plugin 500 with the validator component 541. The validator 541 queries the plugin characteristics via the introspection support 500a provided by the introspection interface for the plugin manager agent 500. Different types of plugins have different validation sequences.

For example, a new set of procedures may be tested for non-perturbation. That is, this type of plugin manager agent is expected to provide a list of the new procedures it contains, and a list of the procedures that might replace procedures that already exist in the target client namespace. The loader 540 checks these against the current state of the client program in order to ensure that the plugin 500 does not inadvertently redefine an existing procedure.

As another example, a plugin 500 might contain a binary load-able library. In this case the loader 540 verifies that the library is of the correct type for the client machine, and that proper versioning structure is maintained, i.e. that older versions do not replace newer versions.

During validation, a plugin manager agent 500 may indicate that it requires the presence or absence of another plugin, or that it replaces another plugin if it is present. In an exemplary embodiment, the loader 540 supports a simple file versioning scheme, where the plugin manager agent 500 is interrogated to determine what files it will create, replace or modify. The loader 540 makes a copy of any existing files that match the names supplied by the plugin manager agent 500, and records the details of file names and the plugin name in a log file. This log file can later be used to roll back the changes that a plugin introduces.

In the event that a plugin manager agent 500 needs to load a file or another plugin, it uses facilities in the client plugin harness 138 to do this, substantially as described above.

The client plugin harness 138 may support local storage of plugin manager agents for reloading. The reloading process is functionally equivalent to loading the plugin manager agent from the original storage site, except for the physical collection of the plugin manager agent itself. If all the plugin manager agent and plugin-related file searching and loading operations have been completed using relative pathnames, then the re-loading process can search for and load these files via local storage. In one embodiment, an option to the load command allows absolute path names to be used for the initial load, but for subsequent searches and loads, a local copy is used if it is available. Without this option, absolute pathnames always result in accesses to the original storage site.

As will be appreciated by those skilled in the art, the client plugin harness 138 may itself be replaced by a new plugin. In this way, support for new features may be added when needed to the harness functionality.

In accordance with one embodiment of the present invention, the client plugin harness 138 completes validation and load operations as described above. In an alternative embodiment, the load and validate functions provide a more rigorous examination of the process and the file system before and after the plugin 500 is loaded in order to provide a high level of confidence that the plugin programmer has properly implemented the introspective description. This "qualifier version" of the harness 138 tests the plugin 500 by executing logic that is gathered from the plugin installer through interrogation. The plugin programmer provides this logic as a part of the plugin introspection interface 500a. Its purpose is to exercise the plugin logic to the degree that it is possible to do so in an automated fashion. In this way, the harness 138 detects most or all of the effects of actually executing the plugin 500, not just loading it.

The qualifier version of the client plugin harness may also be used in a special validation client that collects the results of the load attempt and prepares a report listing details of the changes and potential problems. This process is repeated in multiple passes in combination with other plugins so as to detect harmful interactions. The validation client builds a list of plugins to test against each other by browsing the available plugins and looking at their properties. These properties contain "relation" attributes, lists that describe which plugins can be run together, depend on each other, supercede each other, etc. If there is a relation that applies to an earlier version of the new plugin, then it applies to the new plugin by default, although the plugin programmer can override this. This limits the validation process to those plugin combinations that might actually appear in a normal client.

In accordance with one embodiment that is especially useful when a client machine is first used, the client plugin harness has a "bootstrap" capacity that allows the harness to look for a service that can provide plugins, and then load one or more. This feature can be based on use of a default "bootstrap" plugin that understands how to access minimal functionality in the distributed services network. This service always listens at an Internet address and port number that is either built in to the bootstrap plugin, or is provided to the client program via runtime configuration or user interaction. In one embodiment, the default locations are machines named "esbbootX.Z.com", where the "X" is a number from 1 to 100, and "Z" is the domain name of the subscriber's ISP or some other service. Many port numbers are supported, and this data takes the form of a service point map. The bootstrap plugin sequences through these addresses and port numbers until it finds a working service.

Figure 6:
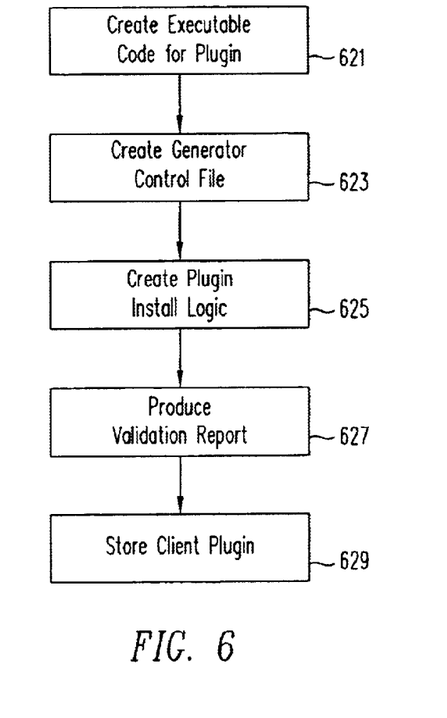
FIG. 6 illustrates a sequence of steps for generating a plugin manager agent in accordance with one embodiment of the present invention.

FIG. 6 illustrates the sequence of steps used to generate a plugin manager agent 118 (step 420 in FIG. 4) according to the embodiments shown in FIGS. 1 and 2. Programmers create client plugin manager agents by first creating the executable code 118b according to the type of source language (step 621). A binary plugin typically consists of a library file of some kind, or of a complete executable.

Once the plugin functionality (such as executable code) is prepared (step 621), the programmer creates a generator control file 120 (step 623) which specifies the details of the plugin 118 such as its name, its storage location, its type and the executable files from which it is constructed. An interface generator 119, 125 may be used to create the plugin agent install logic 118a based on the information in the generator control file 120 (step 625), including programming to provide minimum introspection support and installation management. The interface generator 119, 125 also invokes the validation client in order to produce the required validation report (step 627). After generating the plugin manager agent and using it to produce the validation report, the generator 119, 125 submits the report, the generated plugin manager agent and all relevant files for storage as a plugin manager agent module 118 (step 629).

As will be appreciated by those skilled in the art, the plugin manager agents described here are intended to support any kind of element of programming behavior, including anything that can be sent across a network connection and subsequently executed or accessed by an executing program. This flexibility is based in part by providing each plugin with a interface mechanism for introspectively determining its behavior and requirements, and then providing the relevant information about the plugin performance and requirements on the use of the plugin to any other entity (i.e., the client hosting the plugin or any module calling the plugin) requiring such information (i.e., for installation or execution). This flexibility is also based in part on providing each plugin with an installation manager that can complete any arbitrary installation step without regard to the preprogrammed limitations of the plugin harness.

In accordance with an exemplary embodiment of the present invention, client plugin components are used to implement an element of program behavior in a client program at runtime. Such plugins can also be used with server programs to like effect. The flexibility needed for such implementation is advantageously provided by the present invention through use of parameter-driven behavior that provides introspective information about the plugin.

In an exemplary implementation, the API that the plugins are required to support uses a parameter-driven feature set whereby any changes in the features supported by the API are reflected only in the parameters to the API functions, not in the signatures of the functions themselves. In this way, new features can be added to the API without impacting its compatibility with existing callers of the API. As described herein, this API uses a single API function and a single parameter to control its primary introspection function. This parameter causes the API function to return various kinds of information about itself, i.e. to exhibit reflection, or to take one of potentially many actions.

To address instances where changes in the arguments supported by a function introduce pathological incompatibility that is not evident (for example, version 1.0 of an API supports an option called "output" that opens a file for "append," so that the previous file contents are saved and new output is added, but version 2.0 of the API retains the option but changes its behavior to write, erasing any previous file contents), all interactions between the API user and the API provider (i.e. the plugin loader and the plugin manager agent, respectively) begin with a version sync operation.

Referring to FIG. 5, the loader 540 interrogates the plugin manager agent 500 for a specification of the API version in use, and if the version of the plugin is supported by the loader, then the plugin manager agent 500 is loaded. However, if the plugin version is not supported by the loader 540 at the client, an alternate loader is obtained. For example, the plugin loader is implemented using an application namespace feature such that multiple, incompatible versions of the loader can co-exist in alternate execution namespaces. The client program has at least one version of the plugin loader installed, so other loader versions can be loaded as plugins. All loader versions are available in forms compatible with all other loader versions, so the loader version required in order to load a plugin can always be loaded for use when needed.

Referring again to FIG. 1, there is shown a schematic block diagram of an exemplary client/server system 100 having, among other components, a plugin module (e.g., 135 or 136) that enables dynamic extensibility for computer software according to the present invention. More specifically, a server computing system 117 generates and downloads to a client system 101 a plugin manager agent module 135 that enables dynamic extensibility for computer software residing within the client system 101.

In accordance with the present invention, a user desiring to extend software residing within the client system 101 requests a plugin manager agent module from the server computing system 117. The server computing system 117 has a stored copy of the previously generated plugin manager agent. A plugin delivery module 123 forwards the plugin manager agent to the client system 101. The plugin manager agent 135 is received by a communication device 107 and stored in the memory 105 of the client 101.

On receiving the plugin manager agent 135, a processor 103 interfaces with the plugin manager agent under control of a processing engine 131 (which may reside in memory 105) to evaluate and implement instructions within the installation and management portions of the plugin manager agent 135 to accomplish the desired software extension and/or install the plugin. As will be appreciated, the plugin manager agent installation logic is evaluated by the processor to determine all system dependencies and/or versioning information for the plugin 135 and to correlate this information with the client-side system information so that it can be determined if the plugin can be successfully installed at the client 101, or if instead, additional information or plugins are required for installation. Likewise, any module 141, 142 at the client 101 requesting usage of the plugin 135 may invoke the engine 131 to interface with the introspection aspect of the plugin 135 or may invoke the functional part of the plugin directly.

As an alternate embodiment of the present invention, the server computing system 117 also includes a server plugin interface generator 125 that produces a server plugin interface 143a for server plugin 143 for extending an application at the server 117. When the server functionality of plugin 143 is required by a resident application at the server 117, the server interface engine 127 implements logic within the installation and management portions of the plugin manager agent 143 to enable extension of the application using the plugin 143 if it is determined through introspection of plugin 143 that the module 143 is compatible and/or properly interfaced.

Figure 7:
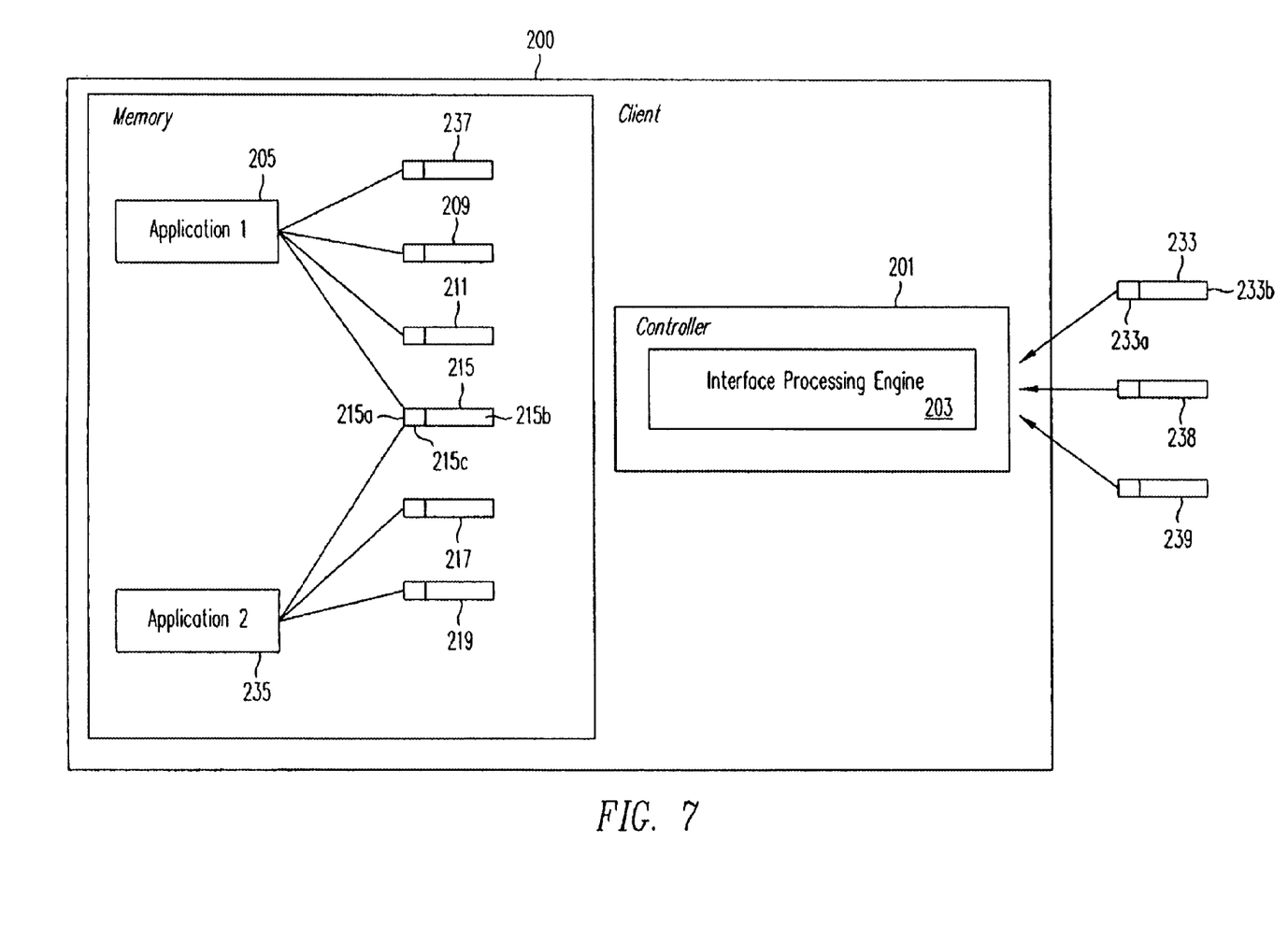
FIG. 7 illustrates an exemplary client system installation of plugin manager agents.

FIG. 7 is an exemplary embodiment of a client system within the client/server network 100 of FIG. 1, illustrating controller installation of plugin manager agent modules using a controller 201 to enable dynamic extensibility of coded applications. More specifically, a controller 201 containing a interface processing engine 203 installs plugin modules 233, 238 and 239 to extend applications 205, 235 as required.

To initiate processing, the controller 201 downloads plugin manager agent module 233, either from a server, through a network or from some other storage media. Residing within the client system 200 are applications 205 and 235. The application 205 includes several modules 237, 209, 211 and 215 that require extensibility. On receiving the plugin manager agent module 233, the controller 201 invokes the introspective interface portions 233a of script plugin module 233 using the interface processing engine 203. As the interface logic is evaluated, all system dependencies and versioning information are correlated to determine if the client system 200 has the resources required by module 233. Once all the required criteria have been met, the controller 201 completely installs plugin module 233 by invoking the plugin manager agent's installation manager component. If additional modules (e.g., modules 238, 239) are required to run module 233, the controller 201 accesses a server to retrieve the modules 238, 239, when such a plugin is available.

Of course, the present invention may also be used each time a module is requested or called, and not just at installation. For example, if execution of a first Application 205 requires use of module 215, a script interpreter 201 invokes the introspection function of plugin manager agent 215 to determine if the required resources for module 215 are present. To run the first Application 205, the controller 201 loads the plugin manager agent module 215 which has an introspective interface 215a. The interface processing engine 203 invokes the introspection and installation logic 215a within the plugin agent module 215. The logic implements evaluation of management or version compatibility information, for example. Thus, the interface engine 203 checks for version compatibility and correlates all information before running the plugin module 215. As the installation logic 215a and the installation manager logic 215c are evaluated, all system dependencies and versioning information are correlated and the plugin 215, in effect, manages its own installation. A success/fail signal is returned to the system controller 201 to indicate progress and availability.

All knowledge of the plugin 215 is encapsulated within the module itself. In addition, the system controller 201 has introspective access to all required information in the plugin manager agent module 215. As the plugin 215 evolves into future modules, for example, only the plugin 215 having a single base of information need be replaced or modified. Moreover, the management of a heterogeneous set of plugins within a system becomes a relatively effortless task.

As described above, the plugin engine or client plugin harness are shown as distinct programs within the client system within the client/server network of FIG. 1. It will be appreciated that this aspect of the present invention can also be implemented as part of another program application. In such an embodiment, an application requiring extensibility includes an introspection segment for interfacing with plugin modules. When the application is executed, the introspection segment identifies and downloads compatible plugin modules as required and on the fly.

As described above, the plugin manager agent module 135 may include its own installation functionality for managing the installation of the module. In such an embodiment, there may be a substantial amount of code or logic (i.e., for managing the process of retrieving necessary modules, deciding whether to complete the installation and actually installing the plugin module) which is repeated in each plugin manager agent module and which provides a high degree of autonomy within each plugin manager agent module. However, from an overall system efficiency standpoint, it may be desirable to have any common installation functionality be incorporated once at the plugin engine. Accordingly, an alternate embodiment of the present invention allocates the installation functionality at the plugin engine, thereby reducing the need to store such functionality as part of each plugin module.

While the system and method of the present invention has been described in connection with the preferred embodiment, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

We claim:

1. An apparatus comprising:
    a computer-readable module for use in a host computer, wherein the module comprises:
        a functional component for providing a predetermined programming functionality;
        an installation component that manages installation of the functional component, wherein
            the installation component comprises logic configured to install the functional component on the host computer, and
        a preprocessing interface for providing introspective information about any requirements of the functional component in response to a request from the host computer.

2. The apparatus of claim 1 wherein the preprocessing interface comprises a command sequence that identifies the functional component.

3. The apparatus of claim 1 wherein the preprocessing interface comprises executable object code that identifies the functional component.

4. The apparatus of claim 1 wherein the request from the host computer occurs as part of an installation of the module in the host computer.

5. The apparatus of claim 1 wherein the request from the host computer occurs when the module is required by a second module stored at the host computer.

6. The apparatus of claim 1 wherein the introspective information provided by the preprocessing interface comprises version information for the module.

7. The apparatus of claim 1 wherein the introspective information provided by the preprocessing interface comprises identification of an external module required by the functional component.

8. The apparatus of claim 1 wherein the introspective information provided by the preprocessing interface comprises identification of the type of functional component.

9. The apparatus of claim 1 wherein the introspective information provided by the preprocessing interface comprises identification of at least a first resource at the host computer that will be modified by the functional component.

10. The apparatus of claim 1, wherein
    the module comprises a new version of the functional component,
    a previous version of the functional component has been installed on the host computer, and
    the installation component installs the new version of the functional component on the host computer.

11. The apparatus of claim 10, wherein
    the new version of the functional component does not require a change to a module on the host computer.

12. The apparatus of claim 1, wherein
    the module is self-installing such that
        a change to a second module on the host computer is not needed to implement a change to an installation of the functional component on the host computer.

13. A computer system comprising a first computer, where the first computer comprises:
    a processor; and
    a memory, wherein
        the memory is coupled to the processor, and
        the memory comprises:
            a plurality of plugin modules, including at least a first plugin module comprised of an introspection interface, an installation program component and a program behavior portion, wherein the installation program component comprises logic configured to install the program behavior portion on the first computer; and a harness for evaluating the introspection interface of the first plugin module to determine if any resources are required for use of the program behavior portion of the first plugin module.

14. The computer system of claim 13 further comprising a second computer connected to the first computer, where the second computer includes a first resource required by the first plugin module that is transferred to the first computer upon request by the plugin installation program component.

15. The computer system of claim 13 further comprising a second computer connected to the first computer, where the second computer includes a first resource required by the first plugin module that is transferred to the first computer upon request by the harness.

16. The computer system of claim 15, wherein the first resource comprises a second plugin module comprised of an introspection interface and a program behavior portion, and wherein the harness is further structured to evaluating the introspection interface of the second plugin module to determine if any resources are required for use of the program behavior portion of the second plugin module.

17. The computer system of claim 13 wherein the harness comprises:

a loader component for loading a plugin module comprised of an introspection interface and a program behavior portion;

a validator component for interfacing with the introspection interface to identify any resources required by the plugin module; and a finder component for surveying the computer system for any resources identified by the validator component.

18. The computer system of claim 13 wherein the introspection interface is an executable script, command series or object-code module.

19. The computer system of claim 13 wherein the installation manager is an executable script, command series or object-code module.

20. The computer system of claim 13 wherein the computer system is a client/server system and the first plugin module is a client plugin module.

21. The computer system of claim 13 wherein the computer system is a client/server system and the first plugin module is a server plugin module.

22. The computer system of claim 13, wherein the first plug-in module comprises a new version of the program behavior portion, a previous version of the program behavior portion has been installed on the host computer, and the installation component installs the new version of the program behavior portion on the host computer.

23. The computer system of claim 22, wherein the new version of the program behavior portion does not require a change to a module on the host computer.

24. The computer system of claim 13, wherein the first plug-in module is self-installing such that a change to a second module on the host computer is not needed to implement a change to an installation of the program behavior portion on the host computer.

25. A method comprising:

receiving a first software module, wherein the first software module comprises an interface, a program portion, and an installation manager portion;

querying the interface of the first software module to identify any resources required by the program portion; and installing the first software module if all resources required by the program portion are available, wherein the installing is performed by the installation manager portion of the first software module.

26. The method of claim 25, further comprising retrieving any resources required by the program portion that were identified as a result of querying the interface prior to invocation of the first software module.

27. The method of claim 26 wherein the retrieved resource comprises a second software module comprised of an introspective interface and a program portion, further comprising querying the interface of the second software module to identify any resources required by the program portion of the second software module.

28. The method of claim 25, further comprising retrieving any resources required by the program portion that were identified as a result of invoking the installation manager portion of the first software module.

29. The method of claim 25, wherein the step of receiving a first software module comprises connecting to a remote computer over a telecommunication network and downloading the first software module from the remote computer.

30. The method of claim 25, wherein the first software module comprises a new version of the program portion, a previous version of the program portion has been installed on the host computer, and the installation component installs the new version of the program portion on the host computer.

31. The method of claim 30, wherein the new version of the program portion does not require a change to a module on the host computer.

32. The method of claim 25, wherein the first software module is self-installing such that a change to a second module on the host computer is not needed to implement a change to an installation of the program portion on the host computer.

* * * * *